United States Patent [19]

Harper et al.

[11] 4,309,390
[45] Jan. 5, 1982

[54] SEPARATION OF COBALT AND MANGANESE FROM TRIMELLITIC ACID PROCESS RESIDUE BY EXTRACTION, PH ADJUSTMENT, AND MAGNET

[75] Inventors: Jon J. Harper, Naperville; Stephen J. Pietsch, Oak Park, both of Ill.

[73] Assignee: Standard Oil Company (Indiana), Chicago, Ill.

[21] Appl. No.: 218,060

[22] Filed: Dec. 19, 1980

[51] Int. Cl.$^3$ ..................... C01G 51/08; C01G 45/00
[52] U.S. Cl. ................................. 423/150; 423/151; 423/152; 423/140; 423/49; 423/50; 75/109; 75/119; 252/412; 252/420
[58] Field of Search ............... 75/109, 119; 252/412, 252/420; 423/49, 50, 150–152, 140

[56] References Cited

U.S. PATENT DOCUMENTS

| | | | |
|---|---|---|---|
| 2,829,170 | 4/1958 | Moore | 75/109 |
| 3,673,154 | 6/1972 | Treuillyan | 423/140 |
| 3,880,920 | 4/1975 | Wampfler | 423/140 |
| 3,940,470 | 2/1976 | Kane et al. | 75/109 |
| 3,956,175 | 5/1976 | Shigeyasu et al. | 423/50 |

FOREIGN PATENT DOCUMENTS 54-130431 10/1979 Japan ..................................... 75/109

*Primary Examiner*—Herbert T. Carter
*Attorney, Agent, or Firm*—Fred R. Ahlers; William H. Magidson; William T. McClain

[57] ABSTRACT

Recovery of cobalt and manganese metal oxidation catalysts from residue of trimellitic acid manufacture and separation of recovered cobalt from recovered manganese can be accomplished by a novel method involving dissolving the residue in water, displacing dissolved cobalt as cobalt metal by manganese metal added to the solution whose pH has been adjusted to pH of 6 and then using magnetic means for separating metallic cobalt from the cobalt-free solution.

3 Claims, No Drawings

SEPARATION OF COBALT AND MANGANESE FROM TRIMELLITIC ACID PROCESS RESIDUE BY EXTRACTION, PH ADJUSTMENT, AND MAGNET

This invention relates to the separation of catalyst metals cobalt and manganese from residues of the manufacture of trimellitic acid by the oxidation with a source of oxygen of liquid pseudocumene in the presence of catalysis provided by bromine and cobalt and manganese alone or with cerium as catalyst metals and the removal of substantial trimellitic acid and, if used, reaction solvent. More specifically, the present invention pertains to the separation of said metals from said residue and from each other by water extraction of the residue, pH adjustment of the extract solution with an inorganic alkaline material to pH6 while adding powdered manganese to precipitate metallic cobalt, and separation of metallic cobalt from the pH adjusted solution with a magnet.

State of the Art

No publication has been found which discloses or suggests the foregoing combination steps for processing a trimellitic acid process residue for the recovery of its contents of cobalt and manganese as well as the separation of them from one another.

It is acknowledged that each step of the combination: (1) water extraction of a trimellitic acid process residue to obtain an aqueous solution of the catalyst metal, (2) the pH adjustment of such solution to precipitate iron if present as a contaminant metal introduced by corrosion of ironcontaining apparatus, the precipitation of a metal from solution by replacement of its dissolved ions by another metal sufficient below it on the listing of metals in the electromotive force (emf) scale with respect to the metal's ability to replace hydrogen and recovering cobalt by magnetic separation; may have been individually known. However, what was not before known was the combination of those steps and their operating conditions for the benefits and purposes of the process of this invention which will be better understood from the background to follow.

BACKGROUND OF THE INVENTION

It is important to the manufacture of trimellitic acid by the catalytic oxidation of liquid pseudocumene with a source of molecular oxygen (e.g., air) to have cobalt, the most expensive metal oxidation catalyst, recovered and recycled to the liquid phase oxidation. For the liquid phase oxidation of methyl-substituted benzenes, in general, it is known that the use of manganese with cobalt as the catalyst metal enhances the production of the benzene carboxylic acid, especially when bromine is the oxidation promoter, more than the sum of the effects of cobalt or manganese alone with bromine. Cobalt has the highest activity of the two metals. Cerium can be used with or to replace part of the cobalt without any loss of the activity due to cobalt especially for the oxidation of liquid pseudocumene to trimellitic acid. But for such oxidation of pseudocumene to maximize trimellitic acid production and minimize co-production of methyl-substituted phthalic acids (partial oxidation products) as difficulty removable impurities, the manganese component of the Co-Mn-Br or Co-Ce-Mn-Br systems of catalysis is either not added at the start of the oxidation of pseudocumene when all of the cobalt is added or only a portion of the manganese is added at that time. According to U.S. Pat. No. 3,491,144 the addition of manganese is delayed until 50 to 55 percent of the oxidation is complete (i.e., 2 to 2.5 moles of oxygen consumed per mole of pseudocumene) and then manganese is added for its oxidation enhancing ability. Also, according to U.S. Pat. No. 3,683,016 a portion of the manganese is used initially with cobalt and some of the cerium and the remainder of the manganese and cerium are added to distinct, separately operated oxidation steps, for example one or two additional steps (a total of two to three steps) operated in series sequence. In such a process the amount of manganese and cerium added to each step is equal to the reciprocal of the total number of steps used.

Thus, to take advantage of the benefits of such staged addition of manganese and still be able to recover and reuse the expensive cobalt component of catalysis to the pseudocumene oxidation, it is important to be able not only to recover cobalt from a residue of the manufacture of trimellitic acid but also to be able to separate cobalt from manganese also so recovered. Such recovery and separation of cobalt and manganese can be accomplished by the invention method to be next defined and described.

SUMMARY OF THE INVENTION

We have devised a novel method of recovery of cobalt and manganese from a residue of trimellitic acid manufacture and the separation of cobalt from recovered manganese. Such method is a combination of dissolution of the residue in water at a final temperature of from 75° C. up to 125° C. by combining said residue while hot with water in a water to residue weight ratio of from 0.5:1 up to 6:1, preferably 1:1 up to 3:1; at least one pH adjustment of the resulting solution of residue in water, a pH of 6, the addition of powdered metallic manganese to the pH6 solution to precipitate metallic cobalt; and removal of metallic cobalt by a magnetic separator.

Powdered manganese is used for cobalt precipitation rather than any other form of metallic manganese because such other solid forms of metallic manganese become deactivated by displaced cobalt plating onto such other solid forms.

The solution remaining after magnetic separation of metallic cobalt can be treated with a carbonate of sodium, potassium or ammonia to precipitate manganese as its carbonate which can then be recovered by the use of a solid-liquid separator (e.g., filter, centrifuge, settling, etc.) and then redissolved as its bromide or acetate for reuse in the oxidation of pseudocumene. The separated liquid, a solution of trimellitic acid and some water-soluble impurities can be heated in two or more series-connected wiped-film evaporators to drive off water and impurities boiling at a temperature lower than trimellitic anhydride and then, in the last of such evaporators, evaporate a rather pure trimellitic acid anhydride (4-carboxyphthalic anhydride). The magnetically separated metallic cobalt can be dissolved in hydrobromic acid and be used both as a source of cobalt oxidation catalyst and bromine promoter.

The pH adjustments of the aqueous solution from the extraction step can be made with any inorganic alkaline material. When contaminant iron is present, the pH adjustment can be made first to pH of 3 to 4, preferably with ammonium hydroxide, to precipitate iron hydroxide for its removal. The adjustment to pH of 6 can be made, preferably by more ammonium hydroxide. Ammonium hydroxide is preferred for said pH adjustments because it does not add to the amount of disposable solids, for example after recovery of trimellitic acid anhydride.

The following TABLE I provides examples of analysis of residues from the manufacture of trimellitic acid (TMLA) per se or its acid anhydride (TMA). Said analyses do not account for the anion of the catalyst metals nor do they account for corrosion metal(s). Analyses showing a more complete accounting of catalyst and corrosion (Fe) metals are later provided.

TABLE I

CHARACTERIZATION OF RESIDUES FROM THE MANUFACTURE OF TRIMELLITIC ACID AND ANHYDRIDE

| COMPONENT, IN WEIGHT % | RESIDUE TMLA | TMA |
|---|---|---|
| Acetic Acid | 1.58 | 0 |
| Phthalic Acids | 12.3 | 1.0 |
| Toluic Acids | 0 | 0 |
| Aldehydes | 0.53 | 1.4 |
| Benzoic Acid | 0.5 | 0 |
| Trimellitic Acid | 38.6 | 65.2[1] |
| OLB Compounds[2] | 4.7 | 1.9 |
| HB Compounds[3] | 0.94 | 0.4 |
| Cobalt | 1.17 | 2.51 |
| Manganese | 0.28 | 0.87 |
| Bromine | 0.94 | 0.15 |

[1] Trimellitic acid anhydride.
[2] "OLB Compounds" are other lower boiling compounds.
[3] "HB Compounds" are higher boiling (higher than trimellitic acid) compounds.

TABLE II

CATALYST AND CORROSION (Fe) METALS CONTENT OF TMA PROCESS RESIDUES

| Co | Fe | Mn | Ce |
|---|---|---|---|
| 1.19 | 0.05 | 0.71 | 0.69 |
| 0.77 | 0.05 | 0.37 | 0.16 |

The following example illustrates the best mode presently contemplated for the conduct of our invention.

EXAMPLE

There are combined and mixed 2.4 kg/hr each of water at 25° C. and hot residue (230° to 235° C.) of trimellitic acid manufacture. Heat is removed from the resulting mixture by indirect heat exchange with the pH6 solution later obtained from the magnetic separation of metallic cobalt. Cooling of the waterresidue composition to 100° C. can be accomplished in this manner and said pH6 solution can be heated to a temperature of from 50° to 75° C. At 100° C. the 1:1 water to residue composition is a solution of the organic and inorganic compounds comprising the residue. The 4.8 kg/hr of such solution is then mixed with 1.48 kg/hr of ammonium hydroxide (28 to 30 wt % $NH_3$) for pH adjustment to pH of 6 whereat 15 grams/hour of powdered manganese are added while the slightly acidic solution is stirred. While the manganese is dissolved, about 0.15 gram/hour of hydrogen is liberated and 10.9 grams of metallic cobalt is precipitated. The resulting suspension of cobalt precipitate in the aqueous solution of manganese salts and of ammonium salts of organic acids amounts to 6.3 kg/hr and is pumped through a magnetic separator wherein 12 grams/hour of wet metallic cobalt are collected and 6.268 kg/hr of pH6 solution is discharged. This discharged solution is passed through coils in the vessel wherein the stirred mixture of residue and water are combined to remove heat therefrom and cool the resulting mixture to a temperature of from 100° to 150° C. and heat the pH6 solution to a temperature of from 50° to 150° C. at a gauge pressure of 1 to 10 kg/cm².

The 12 grams/hour of wet metallic cobalt collected by the magnetic separator are removed and combined with 62 grams/hour of hydrobromic acid (48 wt. % HBr). As the cobalt dissolves there is liberated 0.8 grams/hour of hydrogen. The resulting solution amounts to 73.9 grams/hour and contains 10.9 grams/hour of cobalt ion and 30 grams/hour of bromide ion.

The hot pH6 cobalt-free solution is stirred and 0.768 kg/hr of ammonium carbonate is added thereto to precipitate the manganese content of the solution as manganese carbonate. After filtration to recover the precipitate, it is added to a solution of aqueous acetic acid (55 weight percent acetic acid and 45 weight percent water) containing 3.0 equivalents of acetic acid per gram atom of manganese. The mixture of manganese carbonate and aqueous acetic acid is heated until the precipitate is dissolved. The resulting solution can be used as a source of manganese component for the oxidation of pseudocumene.

The filtrate resulting from the recovery of manganese carbonate precipitate is pumped into an evaporation system containing two series-connected wiped-film evaporators each of whose film-carrying surfaces are heated by hot heat exchange fluid so that its heat can, by indirect heat transfer, be transferred to the feed for evaporation. In the first evaporation step solvent water, ammonia and water of dehydration are removed. The impure trimellitic acid anhydride then flows to the second evaporation step wherein said anhydride in purified form amounts to 0.56 kg/hr evaporates, flows to a condenser cooled to the melting point (168° C.) of trimellitic acid anhydride and is collected as a liquid product.

The invention claimed is:

1. A method of recovery of cobalt and manganese from residue of trimellitic acid manufacture and separation of recovered cobalt from recovered manganese which comprises combining water with said residue while hot at a weight ratio of water to residue of from 0.5:1 up to 6:1 at a final temperature of from 75° C. up to 125° C., at least adjusting the pH of the resulting mixture to pH6, adding powdered manganese to the pH-adjusted solution in an amount of at least 1.0 chemical equivalent of the dissolved cobalt for its precipitation as metallic cobalt, and subjecting the resulting suspension to a magnetic separator for the recovery of metallic cobalt and the separation of a cobalt-free solution of increased manganese ion concentration.

2. The method of claim 1 wherein the weight ratio of water to residue is from 1:1 up to 3:1, the pH adjustment is made by addition of ammonium hydroxide to the solution of residue in water, powdered manganese is added in an amount of from 1.3 to 1.5 chemical equivalents of dissolved cobalt.

3. The method of claim 2 wherein the magnetically separated cobalt is dissolved by hydrobromic acid.

* * * * *